US007904876B1

(12) United States Patent
Critz

(10) Patent No.: US 7,904,876 B1
(45) Date of Patent: Mar. 8, 2011

(54) INTERACTIVE GRAPHICS FORMAT MODEL

(75) Inventor: David Karl Critz, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 1344 days.

(21) Appl. No.: 11/366,302

(22) Filed: Mar. 1, 2006

(51) Int. Cl.
*G06F 9/44* (2006.01)
*G05B 15/00* (2006.01)
*G05B 11/01* (2006.01)

(52) U.S. Cl. ............ 717/104; 717/105; 700/17; 700/83; 715/700; 715/762; 715/763; 715/771

(58) Field of Classification Search .................. 717/104, 717/105
See application file for complete search history.

(56) References Cited

U.S. PATENT DOCUMENTS

| | | | | |
|---|---|---|---|---|
| 6,377,263 | B1* | 4/2002 | Falacara et al. | 345/473 |
| 6,675,230 | B1* | 1/2004 | Lewallen | 719/328 |
| 6,812,941 | B1* | 11/2004 | Brown et al. | 715/854 |
| 7,415,697 | B1* | 8/2008 | Houlding | 717/104 |
| 7,463,263 | B2* | 12/2008 | Gilboa | 345/440 |
| 2003/0128196 | A1* | 7/2003 | Lapstun et al. | 345/180 |
| 2004/0083453 | A1* | 4/2004 | Knight et al. | 717/113 |
| 2007/0168060 | A1* | 7/2007 | Nixon et al. | 700/83 |
| 2007/0168932 | A1* | 7/2007 | Seeger et al. | 717/105 |

OTHER PUBLICATIONS

Liu "Scalable Vector Graphics" 2003 IEEE, pp. 99-101.*

* cited by examiner

*Primary Examiner* — Thomas K Pham
(74) *Attorney, Agent, or Firm* — Nelson Mullins Riley & Scarborough LLP; Kevin J. Canning

(57) ABSTRACT

The present invention provides a graphical model that can be viewed without a graphical modeling environment. An interactive graphic version of the model is generated from the model of the graphical modeling environment. The interactive graphic version can then be viewed using an interactive graphic viewer, such as a plug in to a web browser. The use of an interactive graphic version of the model allows the user to interact with the model. For example the user may pan, zoom, or view properties or subsystems of elements of the model.

36 Claims, 14 Drawing Sheets

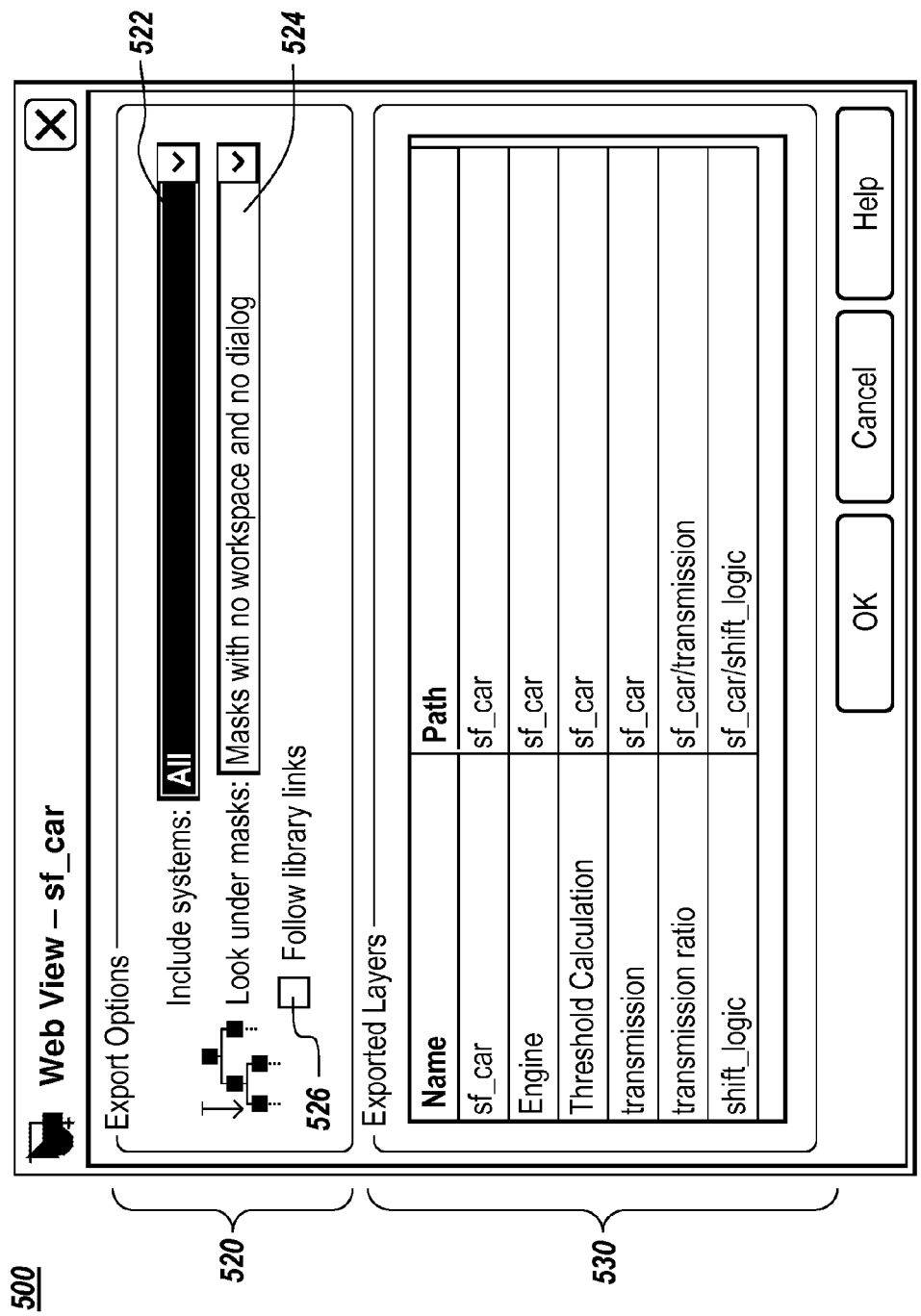

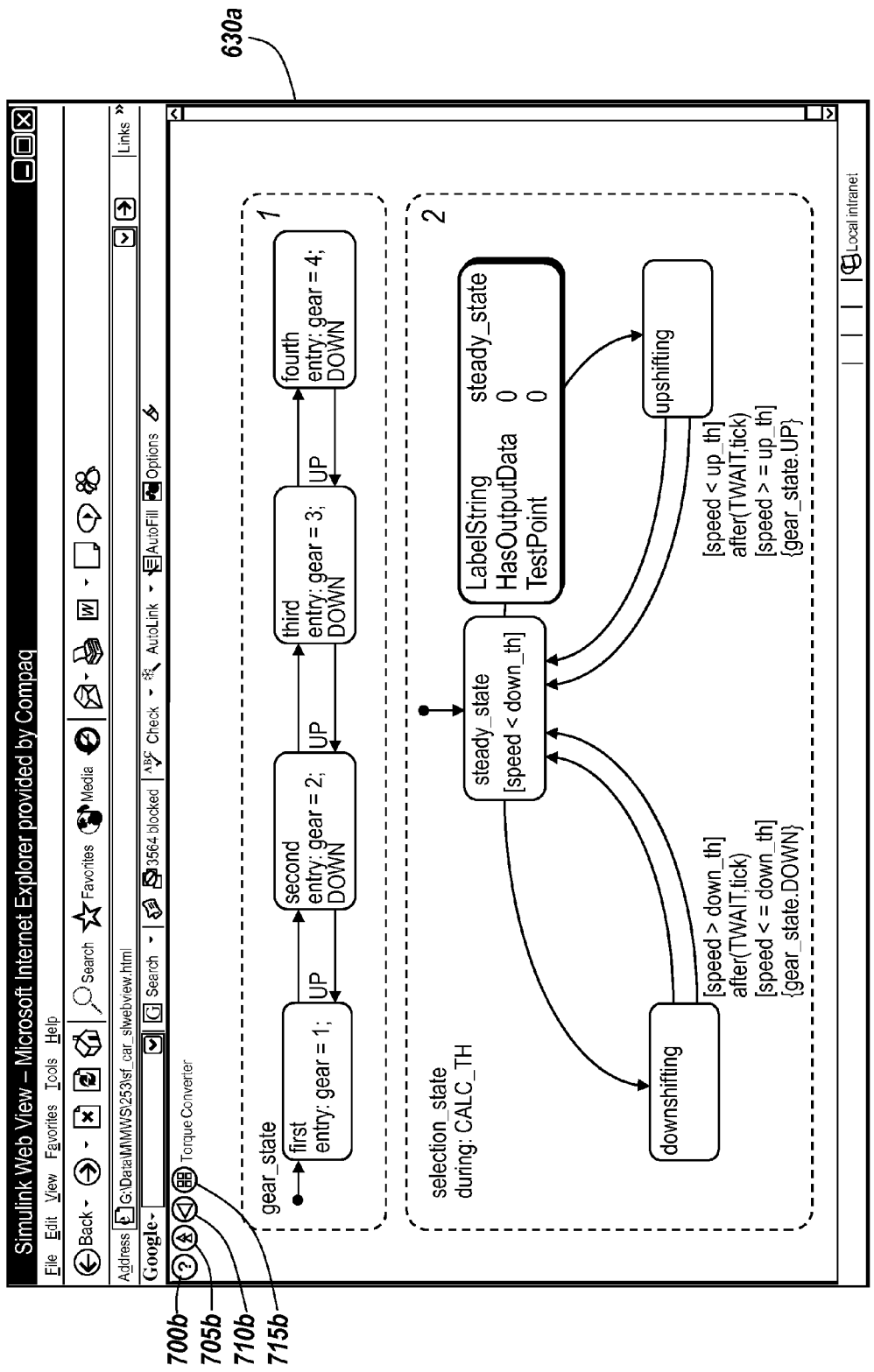

INTERACTIVE GRAPHICS FORMAT MODEL

FIELD OF THE INVENTION

The present invention relates to displaying and viewing graphical models of systems.

BACKGROUND OF THE INVENTION

Many organizations are embracing the paradigm of Model Based Development in their production processes. "Model Based Development" refers to the practice of specifying, analyzing, and implementing systems using a common "model" consisting of a set of block diagrams and associated objects. System implementation typically consists of automatically generating code for portions of the model, particularly portions corresponding to the system's control algorithm.

Graphical modeling environments are an example of software applications that may enable a user to model dynamic systems i.e., systems whose outputs change in response to time or inputs, using a graphical model, such as a block diagram. Some graphical modeling environments also enable simulation and analysis of models. A graphical model may be created using a graphical user interface, such as a graphical model editor. The graphical model depicts relationships between the systems inputs, states, parameters and outputs.

Block diagrams are graphical entities having an "executable meaning" that are created within graphical modeling environments for modeling a dynamic system, and generally comprise one or more graphical objects. For example, a block diagram model of a dynamic system is represented schematically as a first collection of graphical objects, such as nodes, that are interconnected by another set of graphical objects, generally illustrated as lines, which represent logical connections between the first collection of graphical objects. In most block diagramming paradigms, the nodes are referred to as "blocks" and drawn using some form of geometric object (e.g., circle, rectangle, etc.). The line segments are often referred to as "signals". Signals correspond to the time-varying quantities represented by each line connection and are typically assumed to have values at each time instant. Each node may represent an elemental dynamic system, and the relationships between signals and state variables are defined by sets of equations represented by the nodes. Inherent in the definition of the relationship between the signals and the state variables is the notion of parameters, which are the coefficients of the equations. These equations define a relationship between the input signals, output signals, state, and time, so that each line represents the input and/or output of an associated elemental dynamic system. A line emanating at one node and terminating at another signifies that the output of the first node is an input to the second node. Each distinct input or output on a node is referred to as a port. The source node of a signal writes to the signal at a given time instant when its system equations are solved. The destination nodes of this signal read from the signal when their system equations are being solved. In other instances the connections between nodes are non-causal. That is, the line connecting the first node to the second node does not necessarily mean an output is being provided from the first node to the second node as an input. An example of non-causal connections can be found in models of electrical circuits in which there is no computational directionality. Those skilled in the art will recognize that the term "nodes" does not refer exclusively to elemental dynamic systems but may also include other modeling elements that aid in readability and modularity of block diagrams.

It is worth noting that block diagrams are not exclusively used for representing time-based dynamic systems but also for other models of computation. For example, in Stateflow®, flow charts are block diagrams used to capture behavior of reactive systems and the flow of discrete state changes. Data flow models are block diagrams that describe a graphical programming paradigm where the availability of data is used to initiate the execution of blocks, where a block represents an operation and a line represents execution dependency describing the direction of data flowing between blocks.

In certain instances it may be desirable to view a block diagram model when access to a graphical modeling environment is not available. For example, a user may wish to share a block diagram model design with another user. Traditionally, this was done by providing the second user with a copy of the block diagram model design file. The problem with this is that in order to view the block diagram model design, the second user would require a graphical modeling environment to open and view the block diagram model file. Thus each person who wishes to view a block diagram design would require access to a graphical modeling environment. This can be cost prohibitive as each instance of a graphical modeling environment has a cost associated with it. Thus what is needed is a way to view block diagram models without requiring access to a graphical modeling environment.

SUMMARY OF THE INVENTION

The present invention provides a graphical model that can be viewed without a graphical modeling environment. An interactive graphic version of the graphical model is generated from the graphical model in the graphical modeling environment. The interactive graphic version can then be viewed using an interactive graphic viewer, such as a plug in to a web browser. The use of an interactive graphic version of the graphical model allows the user to interact with the graphical model. For example the user may pan, zoom, or view properties or entities of elements of the graphical model and navigate its structure. Furthermore, notes can be made and attached to the graphic version of the graphical model.

In accordance with a first aspect, a method for providing a graphical model that can be viewed outside of a graphical modeling environment is presented. The method comprises obtaining a graphical model in a graphical modeling environment; and storing it in an interactive graphics format. In some embodiments this involves converting the graphical model to an interactive graphics language. In certain embodiments the interactive graphics language comprises a vector graphics language, such as, for example, Scalable Vector Graphics (SVG).

The resulting navigable model in the interactive graphics language may be a single-navigable object. Such object may be embedded in a web page, so that the user browsing the model does not need to leave the single web page. The navigation information may then be embedded in the single-navigable object, not in the HTML of the web page itself. In one embodiment of the invention, all execution related to viewing and navigating the model in the interactive graphics language may be done on a client device independent of a graphical modeling environment.

The original model generated in the graphical modeling environment may be a hierarchical model and the hierarchy may be preserved during the conversion to the interactive graphics language. In accordance with another aspect of the present invention, a user interface may be provided for browsing the model in the interactive graphics language, including navigating to and from different levels in the hierarchy and viewing different subsystems and/or views of the model. In an alternative embodiment of the invention, the user interface may include a mechanism for displaying additional information about the model or its parts. For example, a pop-up window may be generated to display parameter information for one or more blocks or subsystems. The pop-up window may contain information other than just parameter information. For example, in an alternative embodiment of the invention, one or more subsystems may be displayed using pop-up windows. In some embodiments the model may contain references to move to select locations throughout the model hierarchy.

In accordance with another aspect, a medium is provided for use with a computing device holding instructions executable by the computing device for performing a method. The method comprises providing a graphical model in a graphical modeling environment and storing the graphical model in an interactive graphics format. In some embodiments this involves converting the graphical model to an interactive graphics language.

In accordance with another aspect, a system is provided for generating and displaying a graphical modeling application. A system for generating and displaying a graphical modeling application, said system includes a graphical model generated in a graphical modeling environment; and means for storing the graphical model to an interactive graphics format.

In accordance with another aspect, a system is provided for generating and displaying a modeling application. The system comprises a distribution server for providing to a client device, a graphical model in an interactive graphics language; and a client device in communication with the distribution server. In certain embodiments the client device is operable to view a graphical model in an interactive graphics language.

In accordance with another embodiment, in a network having a server, executing a graphical modeling environment, and a client device in communication with the server, a method is provided. The method comprises the steps of providing, at the server, a graphical model in a graphical modeling environment; storing the graphical model to an interactive graphics format; and receiving, at the client device from the server, a graphical model in an interactive graphics format.

Yet another aspect of the invention involves re-animating a simulation run of the model in the interactive graphics language. That is, the model may be originally simulated in the graphical modeling environment, the process and/or result of the simulation recorded and later "re-animated" in the interactive graphics language, without re-simulating the execution of the model. In yet another alternative embodiment of the invention, the model in the interactive graphics language may be connected to a model in the graphical modeling environment, such that modifications to the interactive graphics language model may affect the model in the graphical modeling environment and vice versa.

BRIEF DESCRIPTION OF THE FIGURES

FIG. 5 is an example of a graphical interface for converting a block diagram model in a graphical modeling environment to an interactive graphics language.

FIG. 6C is an example of a Stateflow® state chart of a subsystem of the block diagram of FIG. 6A in an interactive graphics format.

DETAILED DESCRIPTION OF AN ILLUSTRATIVE EMBODIMENT

An illustrative embodiment of the present invention relates to a method and system for providing a graphical model, such as a block diagram model, that can be viewed without a graphical modeling environment. A graphical modeling environment model is converted to a representation in an interactive graphic language and made available in an interactive graphic language. The interactive model can then be viewed using an interactive graphic viewer, such as a plug in to a web browser. The use of an interactive graphic version of the model allows the user to interact with the model. The present invention will be described relative to illustrative embodiments. Those skilled in the art will appreciate that the present invention may be implemented in a number of different applications and embodiments and is not specifically limited in its application to the particular embodiments depicted herein.

Figure 1:
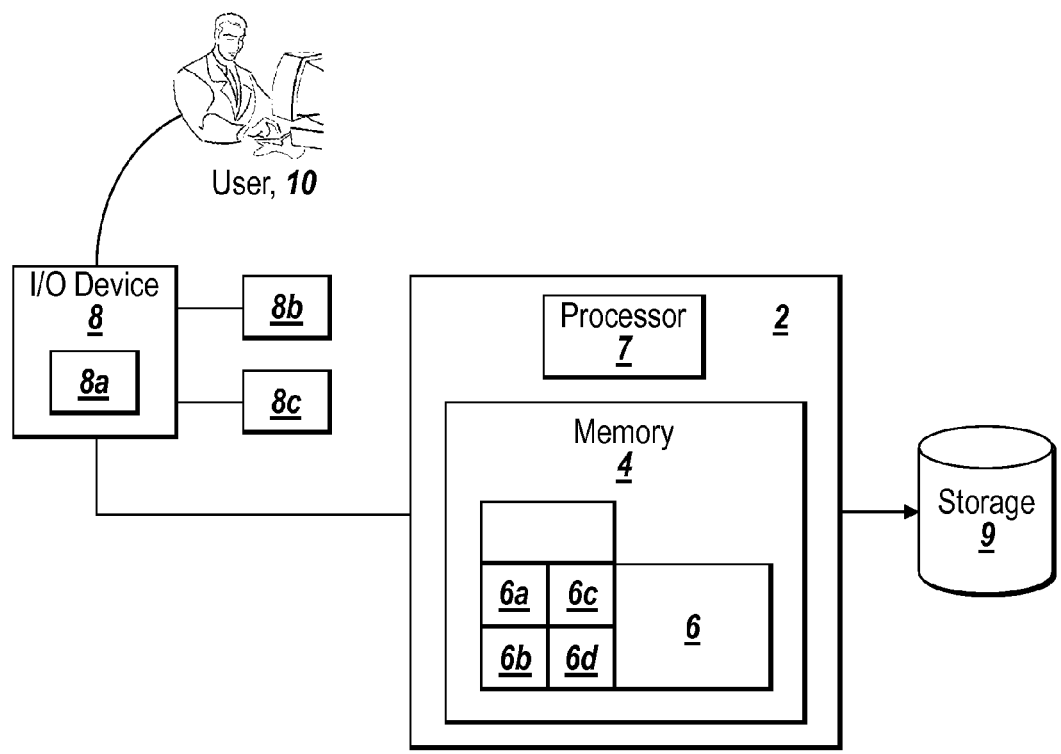
FIG. 1 illustrates an environment suitable for practicing an illustrative embodiment of the present invention.

FIG. 1 depicts an environment suitable for practicing an illustrative embodiment of the present invention. A computing device 2 includes memory 4, on which software according to one embodiment of the present invention is stored, one or more processors (for example, central processing units, CPU, or graphics processing units, GPU) 7 for executing software stored in the memory, and other programs for controlling system hardware. Such processors can have one or more cores allowing for multiple instances of software to run simultaneously on the processor. The use of multiple processors, multiple cores, or both allows for greater computational functionality as multiple applications or processes can be run concurrently on the computing device. In certain embodiments application specific hardware, such as ASICs and FPGAs may be used to execute software stored in the memory, and other programs for controlling system hardware.

Typically, the interaction of a human user 10 with the computing device 2 occurs through an input/output (I/O) device 8, such as a user interface. The I/O device 8 may include a display device 8a (such as a monitor) and an input device (such as a mouse 8b and a keyboard 8c and other suitable conventional I/O peripherals).

For example, the memory 4 holds a diagramming application 6 capable of creating and simulating computational versions of graphical model diagrams, such as time-based block diagrams, state diagrams, signal diagrams, flow chart diagrams, sequence diagrams, UML diagrams, SysML diagrams, dataflow diagrams, electrical circuit diagrams, ladder logic diagrams, kinematic element diagrams, multi-body diagrams, hydraulic circuit diagrams, object diagrams, component diagrams, class diagrams, domain specific diagrams such as traffic network diagrams, Petri nets, entity flow diagrams, relay diagrams, or other models, which may be displayed to a user 10 via the display device 8a. In the illustrative embodiment, the diagramming application 6 comprises a block diagram environment, such as Simulink® or another suitable graphical modeling environment. As used herein, the terms "block diagram environment" and "graphical modeling environment" refer to a graphical application where a system is graphically modeled. Examples of suitable diagramming applications include, but are not limited to, MATLAB® with Simulink®, Stateflow®, SimMechanic SimDriveline, SimEvents, or SimBiology, from The MathWorks, Inc., LabVIEW, DasyLab and DiaDem from National Instruments Corporation, VEE from Agilent, SoftWIRE from Measurement Computing, VisSim from Visual Solutions, SystemVIEW from Elanix, WiT from Coreco, Vision Program Manager from PPT Vision, Khoros from Khoral Research, Halcon from MVTec Software, Dymola from Dynasim, Rose from IBM, Rhapsody from iLogix, Incisive from Cadence and numerous others. The memory 4 may comprise any suitable installation medium, e.g., a CD-ROM, DVD, floppy disks, or tape device; a computer system memory or random access memory such as DRAM, SRAM, EDO RAM, Rambus RAM, etc.; or a non-volatile memory such as a magnetic media, e.g., a hard drive, or optical storage. The memory may comprise other types of memory as well, or combinations thereof.

In an alternative embodiment, the computing device 2 is also interfaced with a network, such as the Internet. Those skilled in the art will recognize that the diagrams used by the diagramming application 6 may be stored either locally on the computing device 2 or at a remote location 9 interfaced with the computing device over a network. Similarly, the diagramming application 6 may be stored on a networked server or a remote peer.

The diagramming application 6 of an illustrative embodiment of the invention includes a number of generic components. Although the discussion contained herein focuses on Simulink®, from The MathWorks, Inc. of, Natick Mass., those skilled in the art will recognize that the invention is applicable to other software applications. Other possible applications include, but are not limited to, SimMechanic, SimDriveline, SimEvents, Stateflow®, SimBiology, or the like as well as any combination thereof. The generic components of the illustrative diagramming program 6 include a block diagram editor 6a for graphically specifying models of dynamic systems. The block diagram editor 6a allows users to perform such actions as construct, edit, display, annotate, save, and print out a graphical model, such as a block diagram, that visually and pictorially represents a dynamic system. The illustrative diagramming application 6 also includes graphical entities 6b, such as signal lines and buses that represent how data is communicated between functional and non-functional units, and blocks 6c. As noted above, blocks are the fundamental mathematical elements of a time based block diagram model. A block diagram execution engine 6d, also implemented in the application, is used to process a graphical model to produce simulation results or to convert the graphical model to executable code. For a block diagram graphical model, the execution engine 6d translates a block diagram to executable entities following the layout of the block diagram as provided by the user. The executable entities are compiled and executed on a computational device, such as a computer, to implement the functionality specified by the model. Typically, the code generation preserves a model hierarchy in a call graph of the generated code. For instance, each subsystem of a model in a block diagram environment can map to a user specified function in the generated code. Real-Time Workshop from The MathWorks, Inc. of Natick, Mass. is an example of a suitable execution engine 6d for generating code.

In the illustrative embodiment, the diagramming program 6 is implemented as a companion program to a technical computing program, such as MATLAB®, also available from The MathWorks, Inc.

The block diagram editor 6a is the user interface component that allows a user to create and modify a block diagram model representing a dynamic system. The blocks in the computable block diagram may model the behavior of specialized mechanical, circuit or software components, such as motors, servo-valves, power plants, blocks, tires, modems, receivers, and other dynamic components. The block diagram editor 6a also allows a user to create and store data relating to graphical entities 6b. In Simulink®, a textual interface with a set of commands allows interaction with the graphical editor. Using this textual interface, users may write special scripts that perform automatic editing operations on the block diagram. A user generally interacts with a set of windows that act as canvases for the model. There is generally more than one window for a model because models may be partitioned into multiple hierarchical levels through the use of subsystems.

A suite of user interface tools within the block diagram editor 6a allows users to draft a block diagram model on the corresponding windows. For example, in Simulink® the user interface tools include a block palette, a wiring line connection tool, an annotation tool, a formatting tool, an attribute editing tool, a save/load tool and a publishing tool. The block palette is a library of all the pre-defined blocks available to the user for building the block diagram. Individual users may be able to customize this palette to: (a) reorganize blocks in some custom format, (b) delete blocks they do not use, and (c) add custom blocks they have designed. The palette allows blocks to be dragged through some human-machine interface (such as a mouse or keyboard) from the palette onto the window (i.e., model canvas). The graphical version of the block that is rendered on the canvas is called the icon for the block. There may be different embodiments for the block palette including a tree-based browser view of all of the blocks.

Figure 2A:
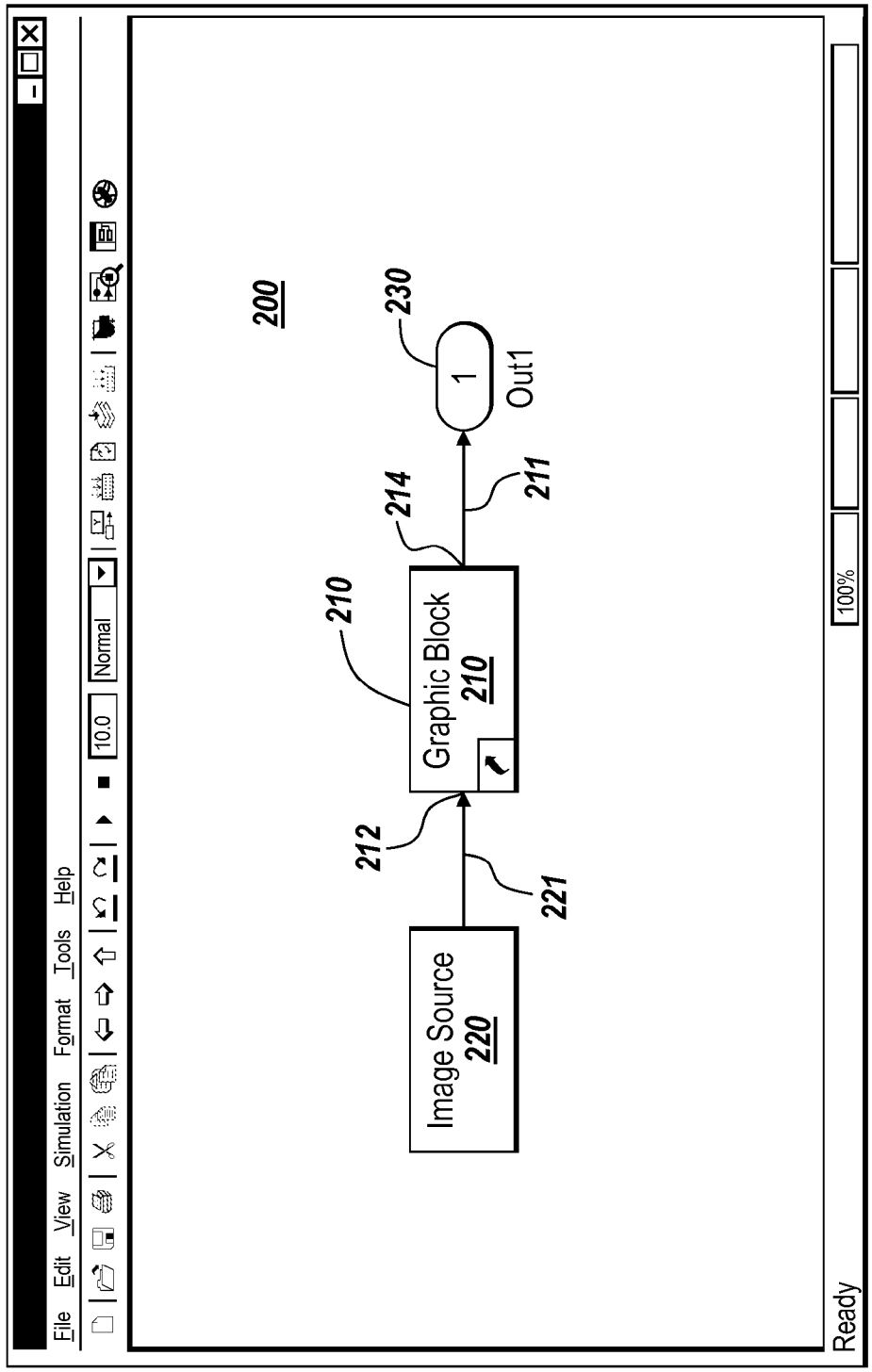
FIG. 2A is an example of a model of a dynamic system in a graphical modeling environment.

A graphical model, such as a block diagram model, of a dynamic system is generally represented schematically as a collection of interconnected graphical objects, such as blocks, ports and lines, which represent signals. FIG. 2A illustrates an example of a block diagram 200 created using the diagramming application 6. Each block in the block diagram 200 represents an elemental dynamic system. Each signal, denoted by lines connecting the blocks, represents the input and/or output of an elemental dynamic system. The illustrative block diagram 200 includes a subsystem block 210, a source block 220 and a destination block 230. A line emanating at one block and terminating at another signifies that the output of the first block is an input to the second block. Ports, such as input port 212 and output port 214 of the subsystem block 210, refer to distinct inputs or outputs on a block. Signals correspond to the time-varying quantities represented by each line connection and are assumed to have values at each time instant when their connected blocks are enabled. The source block 220 for a signal 221 writes to the signal at a given time instant when its system equations are solved. As shown, the signal 221 from the source block passes to the subsystem 210. The signal 211 output from the subsystem 210 passes to the destination block 230. The destination block 230 for a signal 211 reads from the signal 211 when the system equation is being solved. As shown, the signal 211 represents the output of the subsystem 210. One skilled in the art will recognize that the block diagram 200 is merely illustrative of a typical application and is not intended to limit the present invention in any way.

Figure 2B:
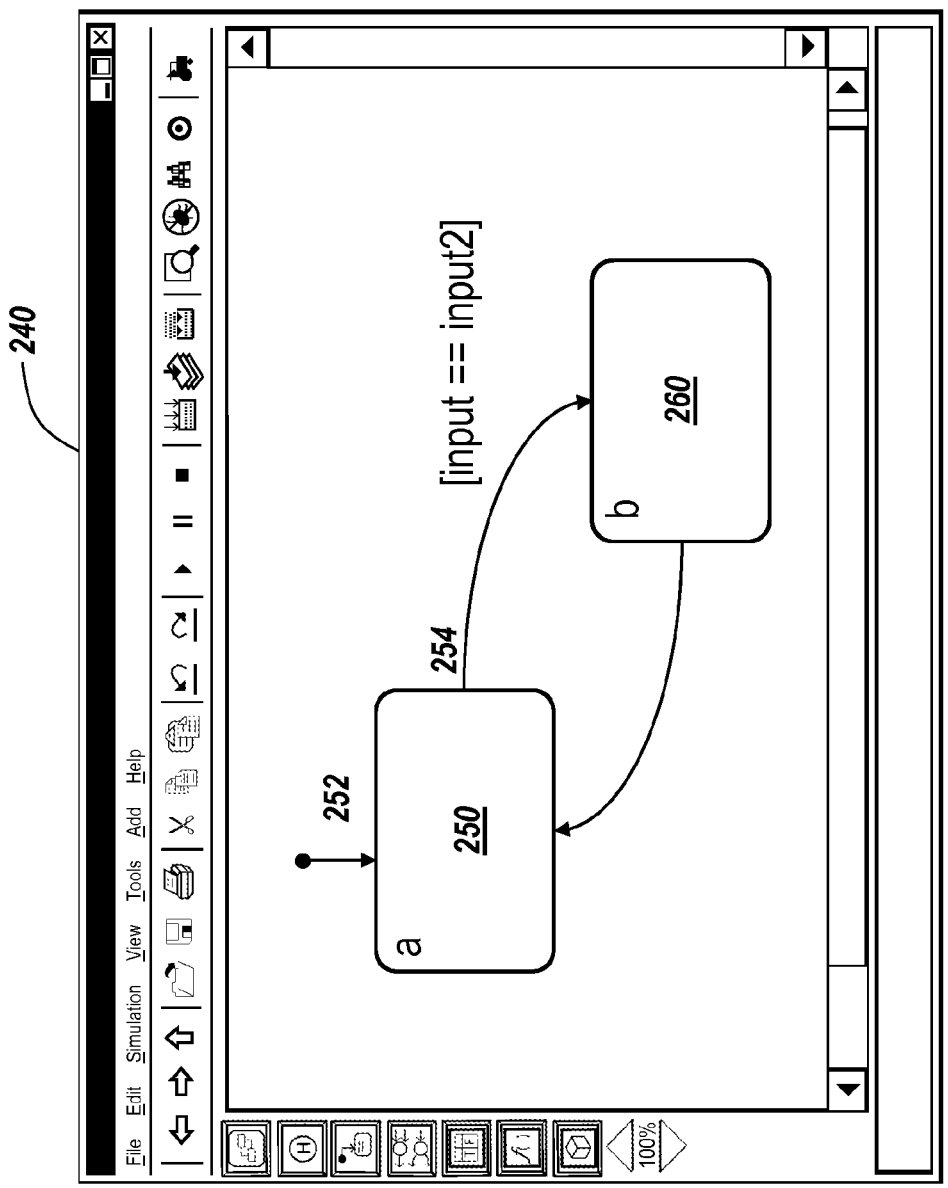
FIG. 2B is an example of a Stateflow® state chart in a graphical modeling environment.

FIG. 2B illustrates an example of a Stateflow® diagram 240 containing Stateflow® blocks 250 and 260 created using the diagramming application 6. Each block in the block diagram 240 represents a state. The lines between the blocks represent state transitions. Ports, such as input port 252 and output port 254 of the Stateflow® block 250, refer to distinct inputs or outputs on a block. One skilled in the art will recognize that the block diagram 240 is merely illustrative of a typical application and is not intended to limit the present invention in any way. Other possible block diagramming applications include discrete event modeling environments such as SimEvents® and modeling environments for modeling physical systems such as SimMechanic® or SimDriveline®, modeling environments for modeling biological or chemical systems such as SimBiology®.

Figure 3:
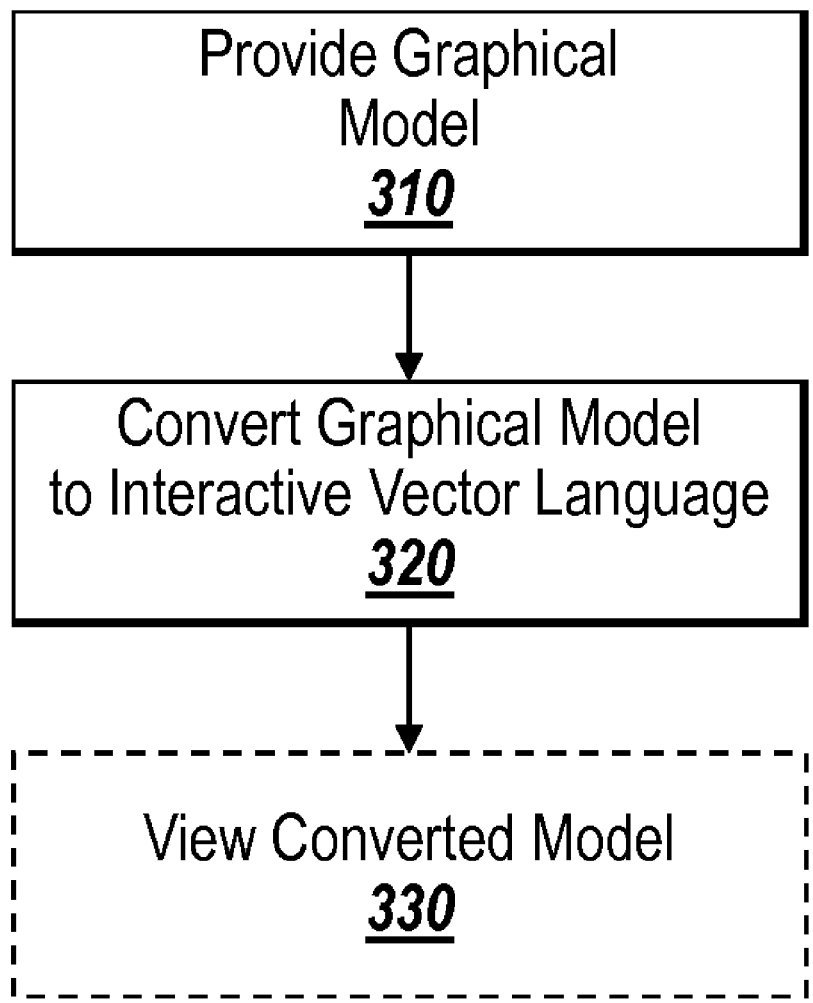
FIG. 3 is a flow chart illustrating the steps performed in an exemplary embodiment of the method of the present invention.

FIG. 3 depicts a flowchart 300 of one exemplary embodiment of a method of the present invention. Here the method involves obtaining a graphicical model in a graphical modeling environment 310 and storing the model to an interactive graphics format 320. In some embodiments, the interactive graphic model may then be viewed using a viewer 330. These steps will be discussed in further detail herein below.

Figure 4A:
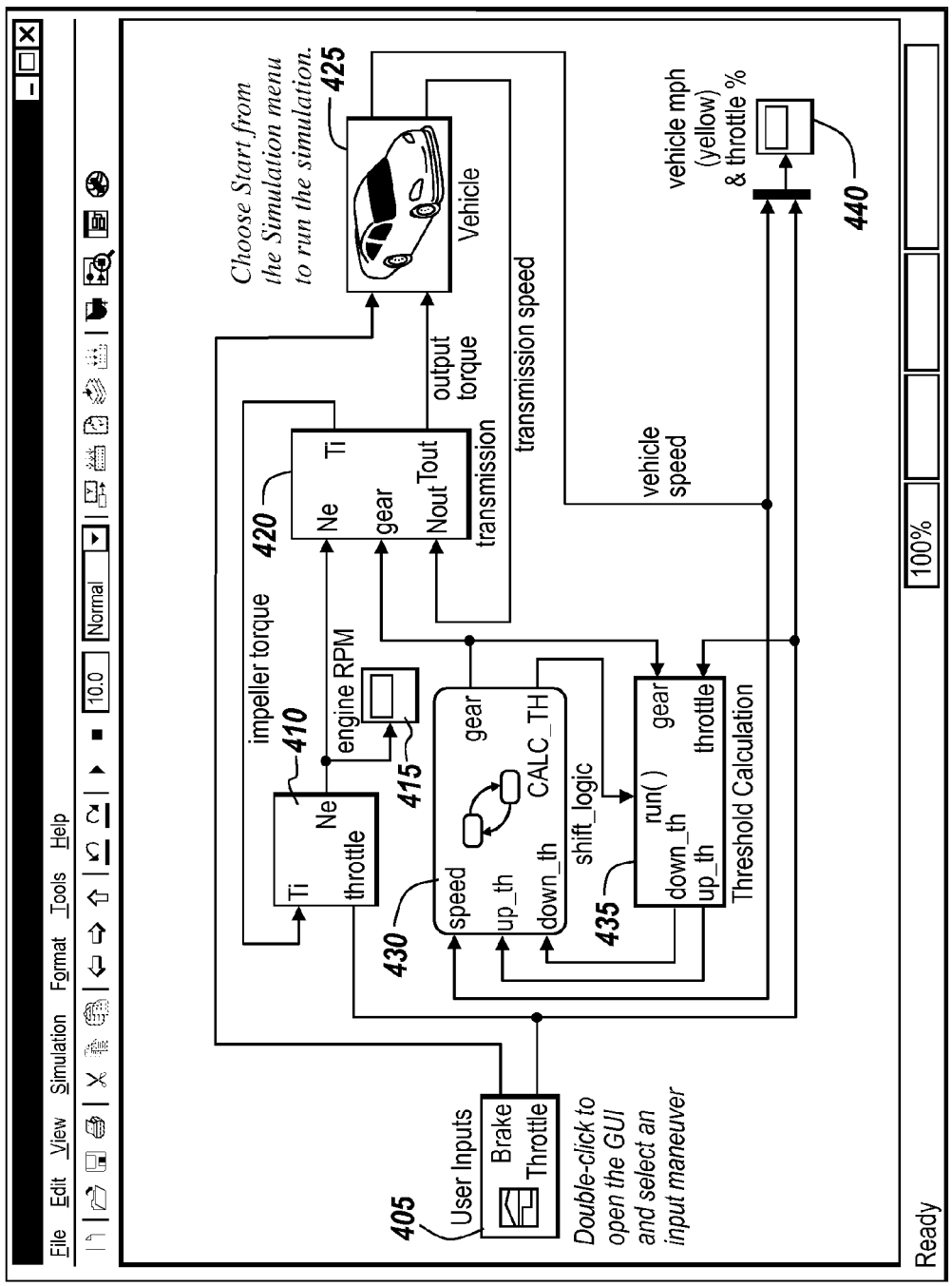
FIG. 4A is an example of a block diagram in a graphical modeling environment.

The provided graphical model (step 310) may be created in the graphical modeling environment, loaded from a pre-existing library of graphical models, or imported from another application or environment. An example of a graphical model is block diagram model 400 shown in FIG. 4A. This exemplary block diagram model 400 includes User Inputs block 405, Engine block 410, engine RPM block 415, transmission block 420, Vehicle block 425, shift_logic block 430, Threshold Calculation block 435, and vehicle mph & throttle % block 440. In this example, these blocks and the connections between them model a car. The elements of such a system may also have related or underlying subsystems. An example of an underlying subsystem model 420a for the transmission block 420 can be seen in FIG. 4B. As depicted here, the subsystem has inputs Ne 450, gear 455, and Nout 460, and has outputs Ti 475 and Tout 480. Blocks 465 and 470 model the Torque Converter and transmission ratio respectively and have inputs Ne 450, gear 455, and Nout 460 and have outputs Ti 475 and Tout 480. In certain embodiments, subsystems may also be of different model types. For example, the shift_logic block 430 has underlying Stateflow® block diagram 430a as depicted in FIG. 4C. The Stateflow state chart 430a in FIG. 6C shows two parallel states gear_state and selection_state. The gear_state state captures which gear is currently active and the selection_state capture the gear shifting process. Initially, first is the active state of the gear_state parallel state in the Stateflow state chart and steady_state is the active state in the selection_state parallel state. When the input speed exceeds a certain threshold up_th, the selection_state parallel state moves into the upshifting state and waits for TWAIT number of ticks before the UP event is issued and the gear_state parallel state moves into the second state. In case the speed falls below up_th before TWAIT number of ticks have passed the selection_state parallel state transitions back into the steady_state state without changes in the state of the gear_state parallel state Elements of underlying subsystems may also have underlying subsystems. It should be understood that the provided examples are for illustrative purposes. Other possible systems and subsystems will be apparent to one skilled in the art given the benefit of this disclosure.

Once a graphical model has been provided (step 310), the block diagram may then be converted to an interactive graphics language (step 320). In certain embodiments the conversion is initiated by a user. This may be performed using a graphical user interface such as shown in FIG. 5. Here the user interface 500 provides options for converting a graphical model in a graphical modeling environment to an interactive graphics language, referred to here as "Simulink Web View." In certain such embodiments the user interface may allow a user to select output options 520 such as included systems 522, graphical masks to be used 524, and any external libraries to be used 526. In some embodiments the user interface may also display the layers, including subsystems, charts, and subcharts that will be included in the conversion 530.

In other embodiments the storing of the graphical model in an interactive graphics format may be initiated by the graphical modeling environment or a related program or application such as a script or Application Programming Interface (API). The storing of the block diagram model in an interactive graphics format may also be initiated by a combination of user and program. Other possible combinations will be apparent to one skilled in the art given the benefit of this disclosure. In certain embodiments the storing of the model in an interactive graphics language may be triggered automatically each time the user makes a change to model or each time it is saved.

The advantage of an interactive graphics language is that it allows a user to interact with the interactive graphic format block diagram model when the model is being viewed. This allows additional functionality to be included with the block diagram model as opposed to static graphical representation. Preferably the interactive graphics language is an interactive vector mark-up language such as Scalable Vector Graphics (SVG). SVG is an XML application language that describes 2D vector graphics which includes animation and scripting functionality. The use of an interactive vector mark-up language such as SVG allows for the inclusion of functionality such as pan, zoom, highlighting, pop-up screens, and selectable elements in the model. Examples of other possible interactive graphic languages include, but are not limited to, Flash, VRML, and PGML formats or the like. Other suitable languages for conversion will be apparent to one skilled in the art given the benefit of this disclosure.

In certain embodiments, the step of storing the model in an interactive graphics format involves converting the model to a interactive graphics language. In one exemplary embodiment, the conversion is performed by determining the graphical tree for the graphical modeling environment model. The graphical tree includes the graphical nodes for the elements of the model used to display the model. The graphical tree also includes the nodes for all the subsystems of the models. The graphical tree for the graphical modeling environment is then translated to a graphical tree for the interactive graphics language. Each node of the graphics tree is processed. Graphic nodes that control state such as pen width, geometric transformations, line color, fill color, or the like are accumulated until needed. Graphic nodes that represent geometry such as lines, circles, polygons, or the like are then translated to the equivalent elements in the interactive graphic language. In addition to the graphical tree, the attributes including, but not limited to, unique ID, name, and navigation code, for each element of the model is obtained and used to build a property table of the model. In a certain embodiment, as indicated in FIG. 5, the level of inclusion for subsystem and properties is selectable. That is, it may be specified if attributes, subsystems, or subsystems of subsystems are to be included in the converted block diagram model. Using this information an interactive graphic version of the block diagram model can be created.

In certain embodiments the resulting interactive graphic format block diagram model is an interactive graphic object. Such an object may be placed or used in other applications. For example, an interactive graphic object may be included as part of a web page or other document. In examples where the block diagram has properties or underlying subsystems, the resulting interactive graphic object may include the properties and underlying subsystems. Alternately, the model could be stored as multiple objects.

In some embodiments, the interactive graphic model may include reference models. For example, these could include empty shells in the original model generated in a graphical modeling environment, that are given by a URL to an interactive graphics model on the interne. Libraries from the graphical modeling environment may also be included in the interactive graphical model allowing a user to view elements not used in the model. This is useful where the model is for a configurable system and the inclusion of libraries allows a user to see other possibilities that were not implemented. The inclusion of libraries and variants, as well as the level of detail for inclusion of libraries and variants may be user selectable. Here variants refers to different mutations of a graphical model, based on some user selected switches such as Booleans. Links between libraries and variants may also be provided allowing the user to navigate between them. Furthermore, a graphical model may be a combination of different layers that contain different types of information. For example, the instrumentation layout of a chemical plant may be present in a layer not typically shown to the modeler. Which layers to include in the stored interactive graphic format can be conditional. Similarly, entities and information of a graphical model may be selectively included. If decided against inclusion, it could be omitted or stored in an encrypted form. Additionally, different versions of the same graphical model can be stored in interactive graphics format along with a navigating option, again possibly taking selection criteria into account. Interactive graphics may also be compared, for example the interactive graphics that correspond to different versions of models. Navigation means to this end may be included in the stored interactive graphic format. Other possible configurations and implementations will be apparent to one skilled in the art given the benefit of this disclosure.

Once the block diagram model of the graphical modeling environment has been stored in an interactive graphics format (step 320) it may then be viewed using a viewer (step 330). In many cases, interactive graphics viewers, such as an SVG viewer, are free plug-ins for web browsers. Thus by storing the block diagram model in an interactive graphic format, it allows a user to view and interact with the block diagram model without requiring the user to have access to a graphical modeling environment. Once in interactive graphic format, a user may view the block diagram on any number of computing devices that can view web documents.

Figure 6A:
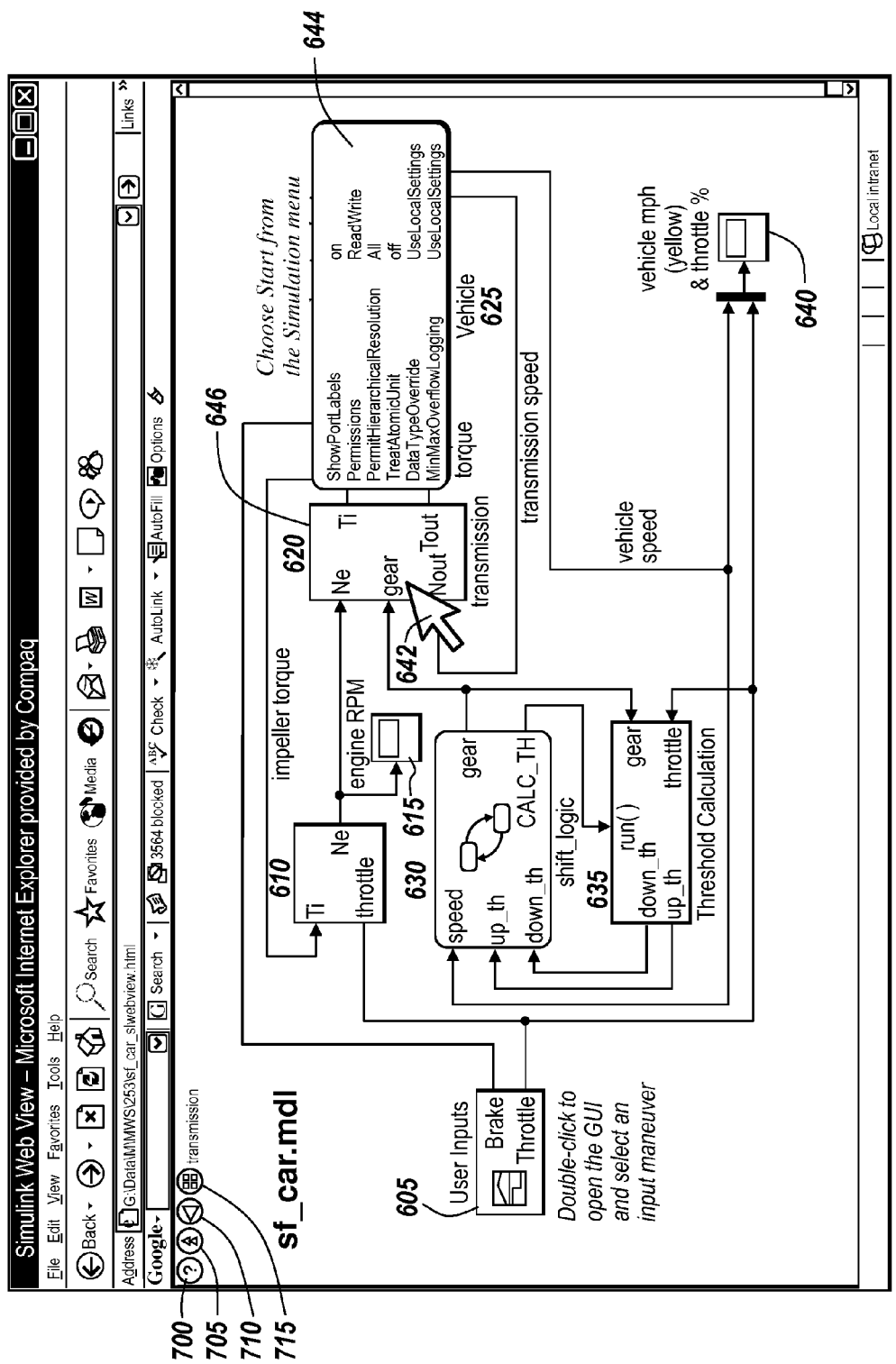
FIG. 6A is an example of a block diagram in an interactive graphics format.

An example of an interactive graphics format model is block diagram 600 shown in FIG. 6A. In this example, the block diagram model 600 was converted from the block diagram model 400 of FIG. 4A. As with the model 400 of FIG. 4, the block diagram model 600 includes User Inputs block 605, Engine block 610, engine RPM block 615, transmission block 620, shift_logic block 630, Threshold Calculation block 635, vehicle mph & throttle % block 640, and Vehicle block 625, used to model a car.

In this example, the interactive nature of the block diagram model 600 allows for the model to react to the pointer icon 642 being moved around the block diagram model 600 by a user. Here, when the pointer icon 642 is moved over the transmission block 620, a pop-up screen 644 is generated providing properties for the block. In certain embodiments, other attributes of a block diagram may be accessed via user interaction. For example, a graphical representation of the behavior of a block diagram model or an element of the block diagram may be displayed when the block diagram or an element is selected. In another example, call backs, related libraries, and variant models may also be included be provided as part of the displayed attributes. The block diagram may also be linked to the original block diagram of the graphical modeling environment such that selection of a block diagram or element allows for editing of the original block diagram or element in the graphical modeling environment. Links to libraries and variants may also be provided. In some embodiments a user may also be able to superimpose annotations, such as notes or comments onto the interactive model in a nonintrusive manner. Other possible attributes or properties will be apparent to one skilled in the art given the benefit of this disclosure.

In some embodiments the transmission block 620 may also be highlighted 646 indicating there is a subsystem for the block 620. If the block 620 is then selected, for example by left clicking the block 620, the block diagram model subsystem is then displayed. An example of the subsystem 620a can be seen in FIG. 6B.

Figure 4B:
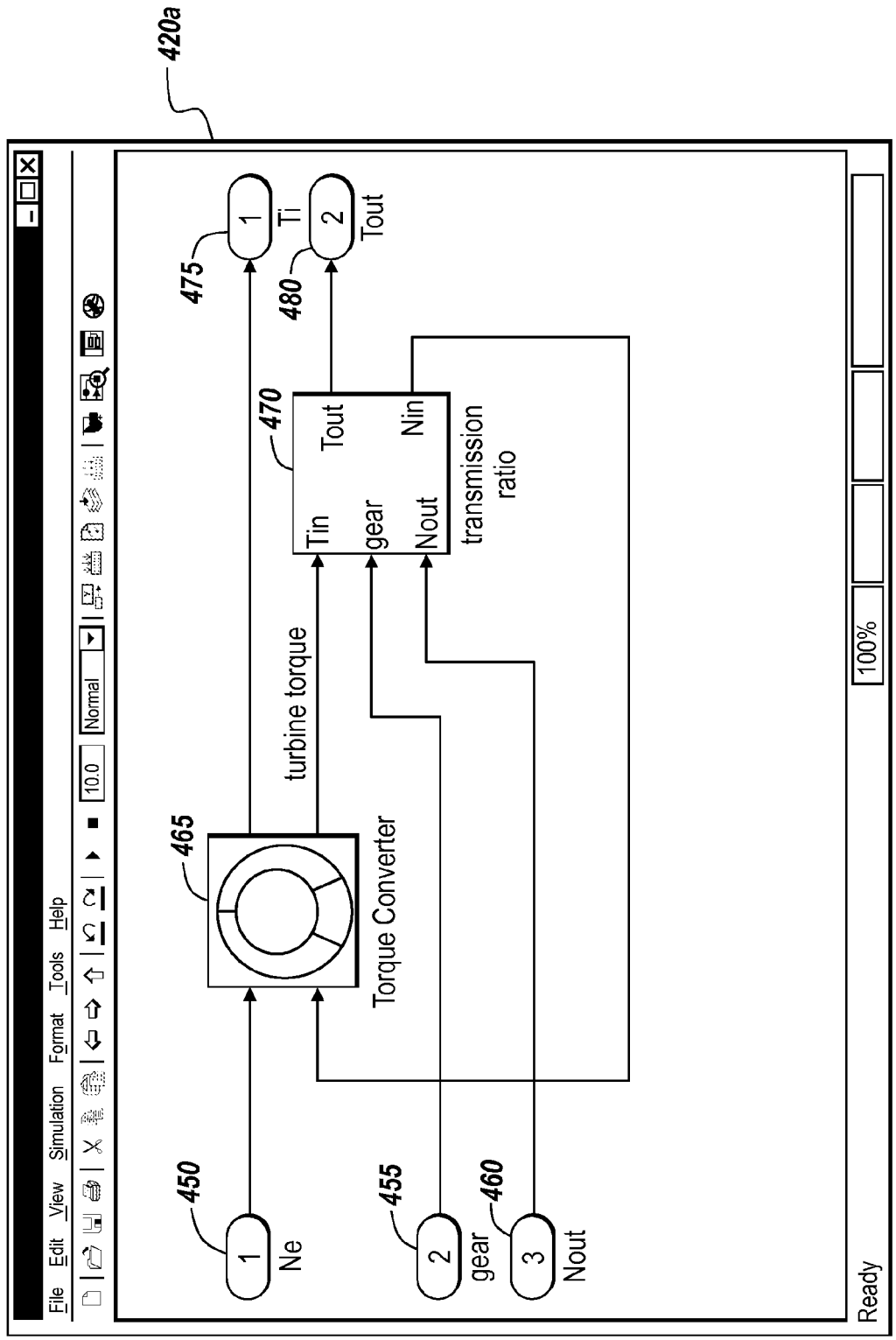
FIG. 4B is an example of block diagram of a subsystem of the block diagram of FIG. 4A.
Figure 4C:
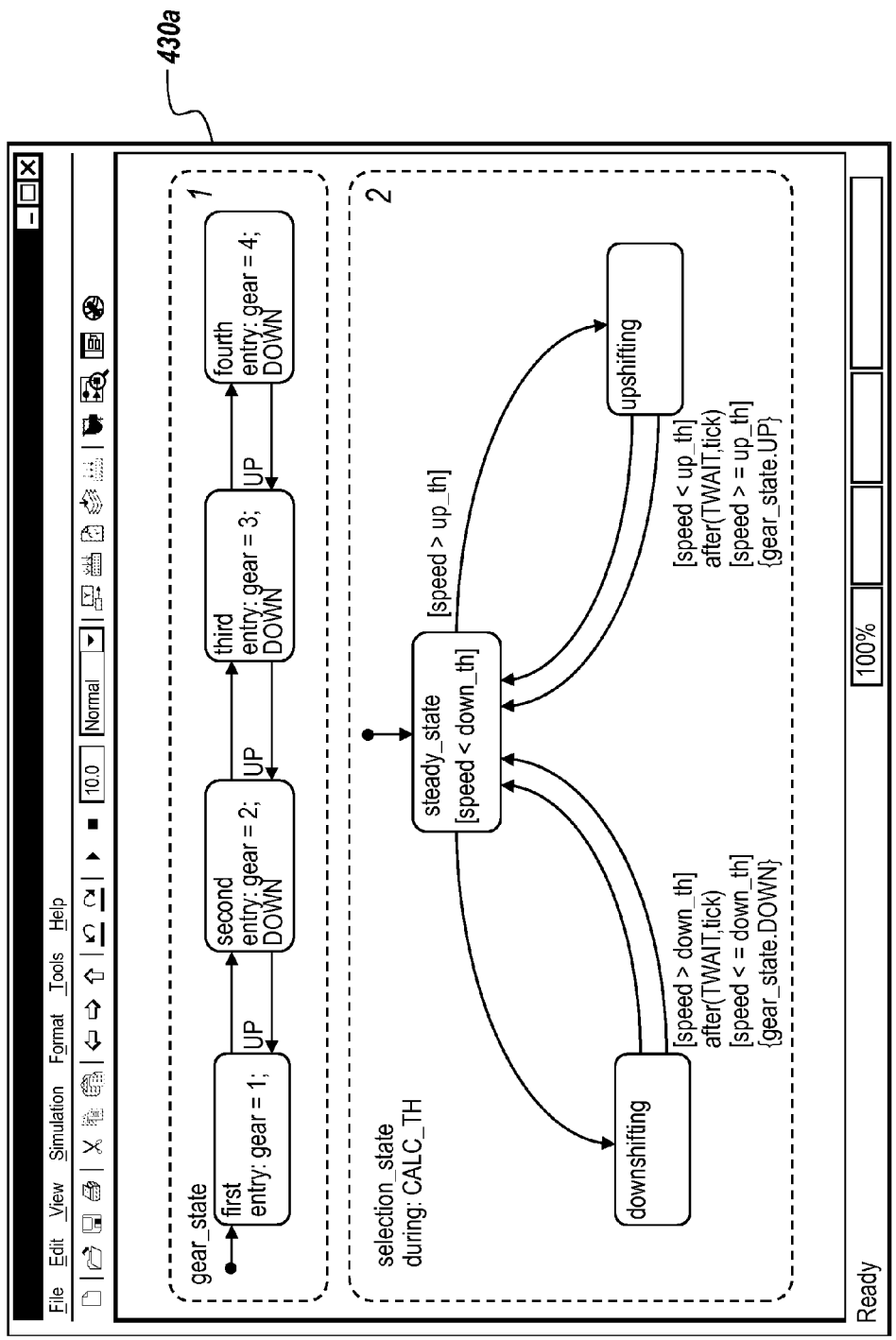
FIG. 4C is an example of a Stateflow® state chart of a subsystem of the block diagram of FIG. 4A

Like the block diagram model 420a of FIG. 4B, the subsystem 620a receives inputs Ne 650, gear 655, and Nout 660, and outputs Ti 675 and Tout 680. Blocks 665 and 670 model the Torque Converter and transmission ratio respectively and receive inputs Ne 650, gear 655, and Nout 660 and generate outputs Ti 675 and Tout 680. As with the block diagram model 600 of FIG. 6A, the block diagram model of the subsystem 620a may also be interactive in nature and react to the pointer icon 642a to display properties of the blocks 644a. In embodiments wherein the original block diagram model had subsystems consisting of Stateflow® blocks such as shift_logic block 430 of FIG. 4A and its underlying system 430a depicted in FIG. 4C, the converted block diagram may also have the underlying subsystem 630a as shown in FIG. 6C. It should be understood that these are but some of the possible implementations and configurations. Other possible implementations and configurations will be apparent to one skilled in the art given the benefit of this disclosure.

Figure 6B:
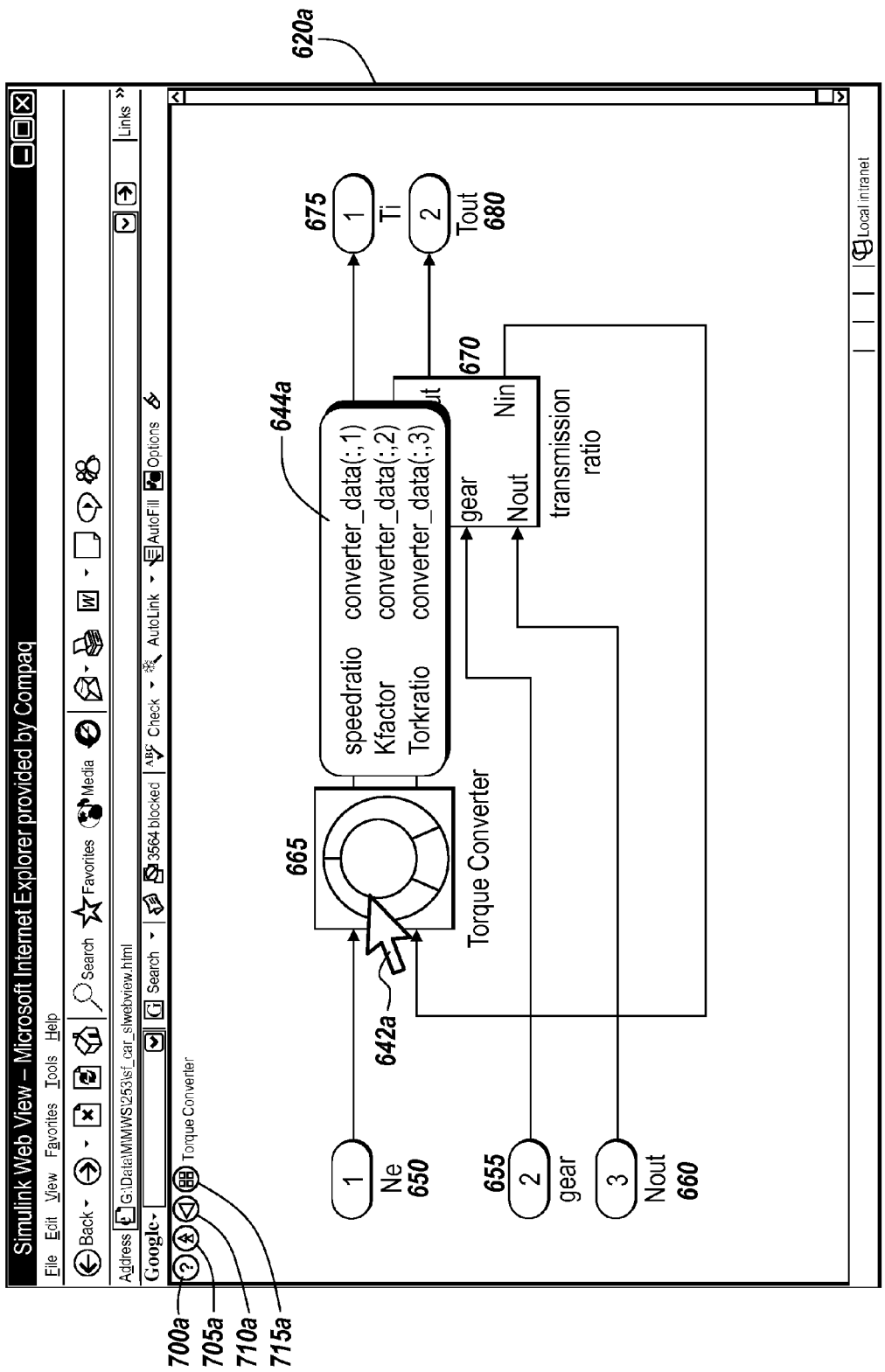
FIG. 6B is an example of block diagram of a subsystem of the block diagram of FIG. 6A in an interactive graphics format.
Figure 7:
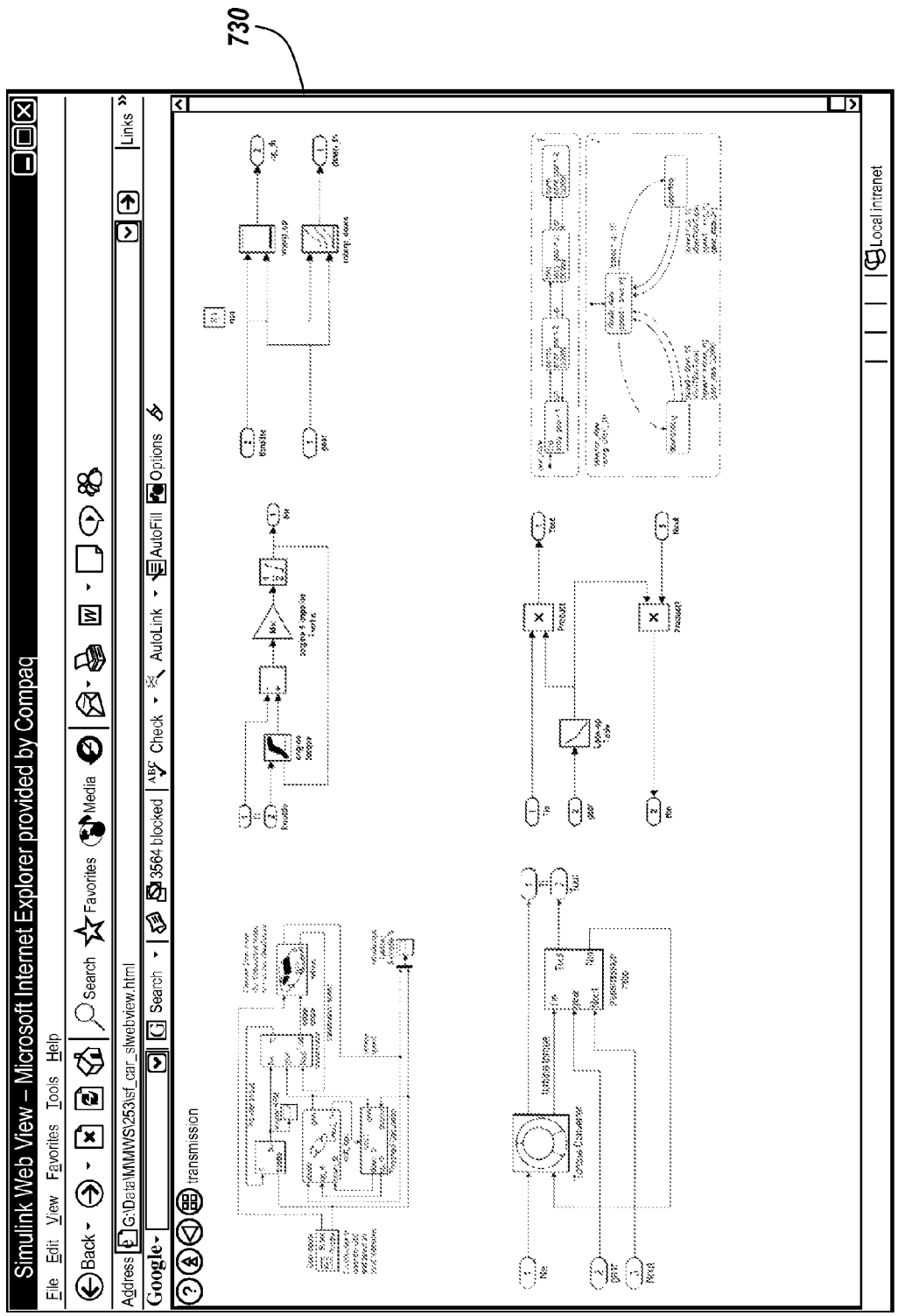
FIG. 7 is an example of viewer display of all the layers of a model in an interactive graphics format.

In certain embodiment the interactive nature of the block diagram models 600, 635a may also provide navigation functionality. In the examples of FIGS. 6A-C, this functionality is provided by navigation buttons 700, 705, 710, 715, 700a, 705a, 710a, 715a, 700b, 705b, 710b, and 715b. Buttons 700, 700a and 700b are "View Previous" buttons. These buttons are used to return the view to the previous layer of the block diagram. In FIG. 6A the block diagram model is the first layer viewed so the button is grayed out. Buttons 705, 705a, and 705b are "View Home" buttons. These buttons are used to return the viewer to the original or "home" layer of the block diagram. In the case of the subsystem block diagram 620a of FIG. 6B the "View Home" button 705a would switch the viewer to the block diagram 600 of FIG. 6A of which block diagram 620a is a subsystem of. Button 705 of FIG. 6A is grayed out because block diagram model 600 is the "home"

layer of the block diagram. Buttons 710, 710*a*, and 710*b* are "Show All Layers" buttons. Selecting these buttons causes all the layers of the block diagram to be displayed in one view 730 as can be seen in FIG. 7. From this view individual layer may be selected to be viewed. By selecting the button again the view is returned to the original view. Buttons 715 and 715*a* provide additional navigation features such as pan and zoom functionality. In other embodiments, hierarchal navigation similar to that provided by Model Explore from The MathWorks, Inc. may be used to display and navigate the layers of a model.

Figure 8:
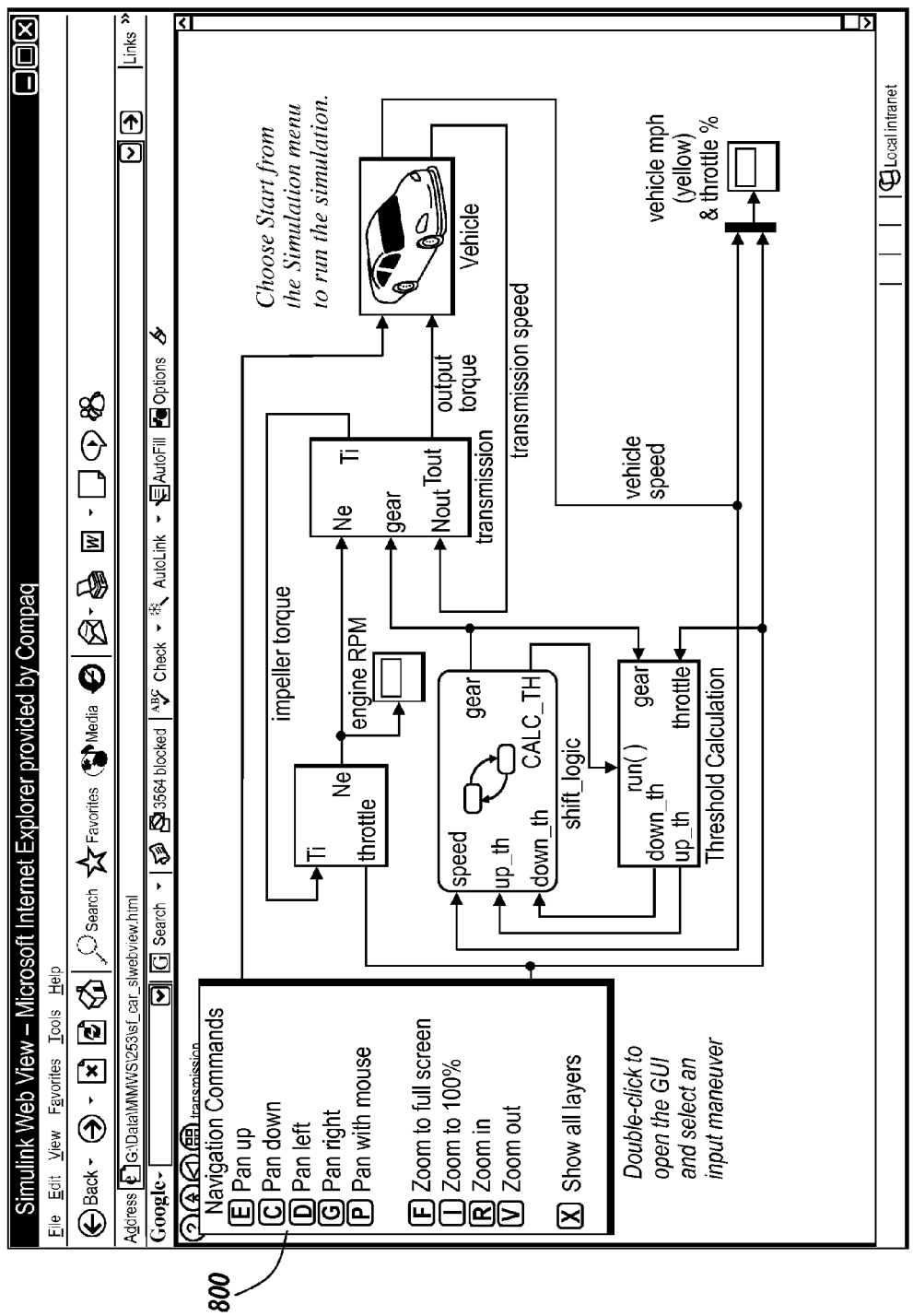
FIG. 8 is an example of a navigation menu used in the present invention.

In some embodiments, navigational functionality may also be accessed via menus, for example a pop-up menu access by right clicking. Still other embodiment may provide navigation via function or hotkeys. An example of such a menu 800 with hotkey designation can bee seen in FIG. 8. Navigation may also be provided by any combination of buttons, menus, or hotkeys. Other possible implementations will be apparent to one skilled in the art given the benefit of this disclosure.

Figure 9:
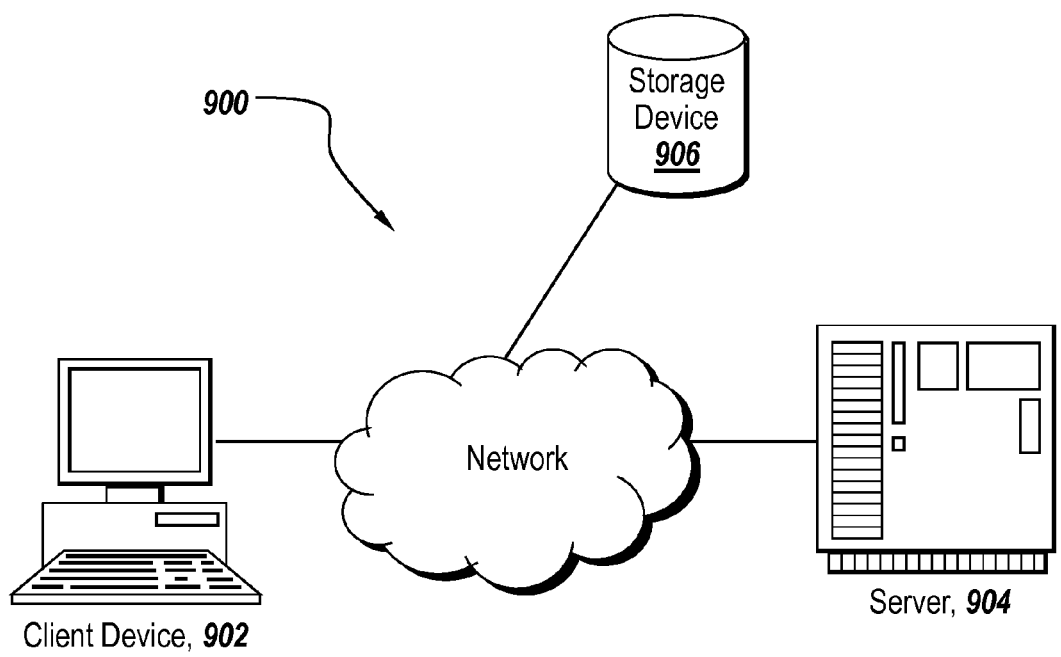
FIG. 9 illustrates an exemplary client-server environment suitable for practicing an illustrative embodiment of the present invention.

The examples to this point have focused primarily on the system where the graphical modeling environment was on a local computational device. The graphical modeling environment may of course also be implemented on a network 900, as illustrated in FIG. 9, having a server 910 and a client device 920. Other devices, such as a storage device 930, may also be connected to the network.

In one such embodiment a system for generating and displaying a graphical modeling application, comprises a distribution server for providing to a client device, a block diagram model in an interactive graphics language; and a client device in communication with the distribution server. Here the distribution server provides a client device, such as a computing device discussed above, with an interactive graphic format block diagram model. The client may then view the block diagram model using an interactive graphics viewer.

In another embodiment, a user may interact with a graphical modeling interface on the server through the client device. In one example of such a system a server and client device are provided. The server is capable of executing a graphical modeling environment. The client device is in communication with the server over a network. A graphical model in a graphical modeling environment is provided or obtained at the server. The graphical model may then be converted to an interactive graphics language. The converted graphical model in interactive graphic format may then be provided to the client device.

It will be understood by one skilled in the art that these network embodiments are exemplary and that the functionality may be divided up in any number of ways over a network.

The present invention has been described relative to illustrative embodiments. Since certain changes may be made in the above constructions without departing from the scope of the invention, it is intended that all matter contained in the above description or shown in the accompanying drawings be interpreted as illustrative and not in a limiting sense.

It is also to be understood that the following claims are to cover all generic and specific features of the invention described herein, and all statements of the scope of the invention which, as a matter of language, might be said to fall therebetween.

What is claimed is:

1. A method for viewing a graphical block diagram model outside of a graphical modeling environment, the method comprising:
   obtaining a graphical block diagram model generated in a graphical modeling environment, the graphical block diagram model representing a dynamic system, the graphical block diagram model including at least one block that represents a portion of the system and at least one line representing a signal provided as an input or an output of the block;
   converting the graphical block diagram model to an interactive graphics language format;
   displaying a view of the graphical block diagram model in the interactive graphics language format outside of the graphical modeling environment; and
   allowing modifying the displayed view without modifying the graphical block diagram model.

2. The method of claim 1 wherein the interactive graphics language format is an interactive vector graphics language format.

3. The method of claim 1, wherein the interactive graphics language format comprises Scalable Vector Graphics (SVG).

4. The method of claim 1 wherein the graphical block diagram model is stored as an interactive vector object.

5. The method of claim 4 wherein storing the graphical block diagram model, including subsystems, results in an interactive object, wherein the subsystems are part of the resulting object.

6. The method of clam 1 wherein the graphical block diagram model generated in a graphical modeling environment includes subsystems that are stored in the interactive format as part of the graphical block diagram model.

7. The method of claim 1, wherein converting the graphical block diagram model is performed at least in part using a graphical user interface.

8. The method of claim 1 comprising storing the graphical block diagram model to a single-navigable object embedded in a web page.

9. The method of claim 8, wherein the single-navigable object is navigable through instructions executed solely on a client side.

10. The method of claim 9, wherein the view of the stored graphical block diagram model comprises viewing properties of selected elements of the stored graphical model.

11. The method of claim 10, wherein properties of selected elements comprise graphical representations of the behavior of the selected elements.

12. The method of claim 1, wherein the view of graphical block diagram model is displayed in the interactive graphics language format using an interactive graphics viewer.

13. The method of claim 12 further comprising:
   representing model hierarchy in the interactive graphics language format.

14. The method of claim 13 wherein the model hierarchy is navigable in the interactive graphics language format.

15. The method of claim 1 further comprising:
   generating pop-up windows to represent a portion of information about the graphical block diagram model.

16. The method of claim 15 wherein the portion of information about the graphical block diagram model comprises one or more of the following: model parameters information, block parameters information, contents of a block, and contents of a subsystem.

17. The method of claim 1 further comprising:
   re-animating, in the interactive graphics language, a simulation of the graphical block diagram model from the graphical modeling environment.

18. The method of claim 1 further comprising:
   connecting the view of the graphical block diagram model in the interactive graphics language format on a client to a graphical modeling environment on a server.

19. A computer-readable medium holding instructions for viewing a graphical block diagram model outside of a graphical modeling environment, the instructions comprising one or more instructions for:
- obtaining a graphical block diagram model generated in a graphical modeling environment, the graphical block diagram model representing a dynamic system, the graphical block diagram model including at least one block that represents a portion of the system and at least one line representing a signal provided as an input or an output of the block;
- converting the graphical block diagram model to an interactive graphics language format;
- displaying a view of the graphical block diagram model in the interactive graphics language format outside of the graphical modeling environment; and
- allowing modifying the displayed view without modifying the graphical block diagram model.

20. The medium of claim 19 wherein the interactive graphics language format is an interactive vector graphics language format.

21. The medium of claim 20 wherein the interactive vector graphics language format comprises Scalable Vector Graphics (SVG).

22. The medium of claim 20 wherein the graphical block diagram model is stored as an interactive object.

23. The medium of claim 22, wherein the graphical block diagram model is stored using a graphical user interface.

24. The medium of clam 20 wherein the graphical block diagram model includes subsystems which are stored in the interactive graphics markup format as part of the graphical block diagram model.

25. The medium of claim 24 wherein storing the graphical block diagram model, including subsystems, results in an interactive vector object, wherein the subsystems are part of the resulting object.

26. The medium of claim 20, wherein the view of graphical block diagram model is displayed in the interactive graphics language format using an interactive graphics viewer.

27. The medium of claim 20 wherein converting the graphical block diagram model further comprises converting the graphical block diagram model to a single-navigable object embedded in a web page.

28. The medium of claim 20 wherein converting the graphical block diagram model to an interactive graphics language format further comprises:
- representing model hierarchy in the interactive graphics language format.

29. The medium of claim 20 further comprising:
- generating pop-up windows to represent a portion of information about the graphical block diagram model.

30. The medium of claim 20 further comprising:
- re-animating, in the interactive graphics language format, a simulation of the graphical block diagram model from the graphical modeling environment.

31. A system for generating and displaying a graphical modeling application, said system comprising:
- a graphical block diagram model generated in a graphical modeling environment, the graphical block diagram model representing a dynamic system, the graphical block diagram model including at least one block that represents a portion of the system and at least one line representing a signal provided as an input or an output of the block;
- means for converting the graphical block diagram model to an interactive graphics language format;
- means for displaying a view of the graphical block diagram model in the interactive graphics language format outside of the graphical modeling environment; and
- means for allowing modifying the displayed view without modifying the graphical block diagram model.

32. A system for generating and displaying a graphical modeling application, said system comprising:
- a distribution server for providing a graphical block diagram model in an interactive graphics language format, the graphical block diagram model representing a dynamic system, the graphical block diagram model including at least one block that represents a portion of the system and at least one line representing a signal provided as an input or an output of the block, the graphical block diagram model being converted to the interactive graphics language format;
- a display device for displaying a view of the graphical block diagram model in the interactive graphics language format outside of the graphical modeling environment; and
- an interface for allowing modifying the displayed view without modifying the graphical block diagram model; and
- a client device in communication with the distribution server, the distribution server providing the graphical block diagram model in the interactive graphics language format to the client device.

33. In a network having a server executing a graphical modeling environment and a client device in communication with the server, a method comprising:
- obtaining, at the server, a graphical block diagram model in a graphical modeling environment, the graphical block diagram model representing a dynamic system, the graphical block diagram model including at least one block that represents a portion of the system and at least one line representing a signal provided as an input or an output of the block;
- converting the graphical block diagram model to an interactive graphics language format;
- receiving, at the client device from the server, a converted graphical block diagram model in the interactive graphics language format;
- displaying a view of the graphical block diagram model in the interactive graphics language format outside of the graphical modeling environment; and
- allowing modifying the displayed view without modifying the graphical block diagram model.

34. The method of claim 33 wherein the graphical block diagram model is executable solely on the client device.

35. The method of claim 33 wherein the interactive graphics language format comprises Scalable Vector Graphics (SVG).

36. The method of claim 33 further comprising storing the graphical block diagram model results in an interactive graphical object.

* * * * *